(12) United States Patent
Doyle et al.

(10) Patent No.: US 11,150,157 B2
(45) Date of Patent: Oct. 19, 2021

(54) APPARATUS AND METHOD FOR LOCATING A MEASURAND ANOMALY ALONG A WAVEGUIDE

(71) Applicant: Halliburton Energy Services, Inc., Houston, TX (US)

(72) Inventors: Crispin Doyle, Swindon (GB); Christopher Staveley, Ascot (GB)

(73) Assignee: Halliburton Energy Services, Inc., Houston, TX (US)

( * ) Notice: Subject to any disclaimer, the term of this patent is extended or adjusted under 35 U.S.C. 154(b) by 280 days.

(21) Appl. No.: 16/473,318

(22) PCT Filed: Jan. 19, 2018

(86) PCT No.: PCT/GB2018/050167
§ 371 (c)(1),
(2) Date: Jun. 25, 2019

(87) PCT Pub. No.: WO2018/134617
PCT Pub. Date: Jul. 26, 2018

(65) Prior Publication Data
US 2019/0353552 A1    Nov. 21, 2019

(30) Foreign Application Priority Data

Jan. 20, 2017 (GB) .................... 1700984.6

(51) Int. Cl.
*G01M 3/38* (2006.01)
*G01K 11/3206* (2021.01)
*G01M 11/08* (2006.01)

(52) U.S. Cl.
CPC ........... *G01M 3/38* (2013.01); *G01K 11/3206* (2013.01); *G01M 11/085* (2013.01)

(58) Field of Classification Search
CPC ...... G01M 3/38; G01M 11/085; G01M 3/047; G01M 11/083; G01M 3/002; G01K 11/3206
See application file for complete search history.

(56) References Cited

U.S. PATENT DOCUMENTS 7,564,540 B2 * 7/2009 Paulson ................ G01M 3/047
356/35.5
8,699,009 B2 * 4/2014 Li ......................... G01M 11/083
356/33
(Continued)

FOREIGN PATENT DOCUMENTS

CN  102052930 A    5/2011
CN  102301206 A   12/2011
(Continued)

OTHER PUBLICATIONS

International Search Report, PCT/GB2018/050167, dated Apr. 9, 2018.
(Continued)

*Primary Examiner* — John Bedtelyon
(74) *Attorney, Agent, or Firm* — John Wustenberg; Baker Botts L.L.P.

(57) ABSTRACT

An apparatus for locating a measurand anomaly, such as a hot-spot, along an optical waveguide is provided having: an optical waveguide, a light source configured to transmit light along the waveguide and a plurality of sensors provided along the waveguide. Each sensor is configured to reflect a portion of light propagating along the waveguide at a respective sensor wavelength corresponding to a measurand. The plurality of sensors is configured into one or more sets according to their sensor wavelengths, each set comprising a plurality of sensors with respective sensor wavelengths, wherein the sensors are configured such that the sensor wavelength for each sensor in a respective set is substan- (Continued)

tially equal when the measurand experienced by each of the sensors in that set is equal. The apparatus further includes a detector configured to monitor the light reflected by the sensors, and a control system.

20 Claims, 5 Drawing Sheets

(56) References Cited

U.S. PATENT DOCUMENTS

| | | |
|---|---|---|
| 2004/0067003 A1 | 4/2004 | Chliaguine et al. |
| 2010/0005860 A1 | 1/2010 | Coudray et al. |

FOREIGN PATENT DOCUMENTS

| | | |
|---|---|---|
| CN | 103259170 A | 8/2013 |
| CN | 103674079 A | 3/2014 |
| CN | 103954226 A | 7/2014 |
| WO | 2015199590 A1 | 12/2015 |

OTHER PUBLICATIONS

Demand for International Preliminary Examination under Article 31, PCT/GB2018/050167, dated Nov. 20, 2018.
International Preliminary Report on Patentability, PCT/GB2018/050167, dated Dec. 12, 2018.
Search Report issued in related Chinese Patent Application No. 201880007117.9 dated Aug. 26, 2020, 3 pages (no translation).

\* cited by examiner

APPARATUS AND METHOD FOR LOCATING A MEASURAND ANOMALY ALONG A WAVEGUIDE

CROSS-REFERENCE TO RELATED APPLICATIONS

This application is the U.S. national stage application of International Application PCT/GB2018/050167, filed Jan. 19, 2018, which international application was published on Jul. 26, 2018, as International Publication WO 2018/134617 in the English language. The International Application claims priority of Great Britain Patent Application No. 1700984.6, filed Jan. 20, 2017. The international application and British application are both incorporated herein by reference, in entirety.

FIELD OF THE INVENTION

The present invention relates to a method and apparatus for locating a measurand anomaly along a waveguide. An example relates to the use of fibre Bragg gratings (FBG) for detecting and locating a gas leak from the bleed air duct of an aeroplane.

BACKGROUND OF THE INVENTION

In many industries it is desirable to monitor measurands and to locate any anomalies in these measurands, such as a temperature in excess of or beneath a normal operating range, at different positions along an installation. One such example is in the aerospace industry. Modern aeroplanes often make use of engine 'bleed air' for functions such as running the air conditioning, preventing ice build-up on flight surfaces and preventing electronics from becoming too cold when flying at altitude. This bleed air is tapped from a jet or turboprop engine just after the initial compressor stages, so it is at high pressure and temperature (up to 300° C.) and is conveyed around the aeroplane in insulated ducts. If one of these ducts should suffer a leak, hot bleed air would escape and could rapidly cause damage to aeroplanes systems and perhaps even to structures close to the leak. It is therefore important to know when and where a leak occurs so that the flow of air through the failed duct can be shut down before any damage occurs.

The current preferred method of leak or "Hot-Spot Detection" (HSD) involves running one or two continuous electrical sensors alongside each duct. These sensors comprise a metal tube forming an outer conductor and a wire suspended centrally in a solid salt, forming an inner conductor. Under normal operation, the two conductors are electrically isolated from each other but when the temperature reaches a certain value, the salt melts and a short-circuit is made between them. This is detected and a measure of the electrical characteristics (for example resistance and capacitance) between the two conductors is used to determine the location of the so-called hot-spot. An alarm will then be raised alerting a user to the location of the hot-spot. While this technology is functional, this system has certain disadvantageous characteristics, namely:

1) The temperature at which the alarm is raised is determined by the salt composition and cannot be adjusted, although different compositions may be used in different parts of the sensor to allow for different alarm temperatures.

2) The salt-filled conductors can only be manufactured in short lengths and are prone to break under a shearing force. This means that they are typically produced in relatively short lengths and so many sections need to be connected together to cover a complete duct. For example, 200 connectors may be required to cover a single bleed air duct of an aeroplane. Installation of these sensors is time-consuming. Furthermore each connector provides an additional potential point of failure.

3) The sensor chains are heavy due to the number of metallic parts and connectors required.

4) The nature of the electrical measurement means that the leak cannot always be localised accurately.

It is known to monitor measurands such as pressure, temperature or strain using optical fibres. These techniques generally do not suffer from the abovementioned problems associated with multi-segmented salt filled cables. Current distributed temperature sensors (DTS) based on backscattered light detection, either Brillouin or Raman scattering, are not suitable for aeroplanes use because they require powerful lasers which may constitute an ignition hazard due to their high energy and expensive, delicate optoelectronic processing units.

Fibre Bragg gratings (FBG) make excellent temperature sensors, but using them for HSD is not straightforward because they are point sensors and the application demands continuous coverage of many tens of metres of ducting. Time-division multiplexing (TDM) and Wavelength division multiplexing (WDM) are two techniques commonly used for monitoring measurands using FBGs.

TDM systems cannot offer the spatial density required for detecting a leak along a bleed air duct. In conventional TDM systems the sensors typically need to be separated by at least 1 m along the waveguide in order for the reflected pulses to be individually resolvable according to the time of flight. A leak is usually highly localised and may initially only extend over 5 cm, so the system has a 95% chance of missing it entirely.

WDM cannot practically offer the large number of sensors required for covering a bleed air duct. In WDM each FBG sensor is configured to reflect light at a different respective Bragg wavelength within a different discrete wavelength band. Current WDM systems are limited to approximately 130 FBG sensors per fibre. If the FBG sensors are each spaced 5 cm apart, i.e. 20 FBGs per metre, this limits the system to 130/20=6.5 m. This is too short as a bleed air duct can extend 50 m or more in length. Many fibres would therefore be required to operate a WDM system, which increases the cost and complexity of the system.

Optical Frequency Domain Reflectometry is a technique for addressing many hundreds of low-reflectivity gratings on one fibre. However, it requires expensive and delicate instrumentation (typically in excess of 100 k USD) which is not suitable for applications such as aeroplanes.

It is desirable to provide an improved method and apparatus for locating a measurand anomaly along an optical waveguide that does not suffer from the above mentioned deficiencies. In particular, it is desirable to provide a simple, light-weight, robust, flexible and cost-effective apparatus which can locate a measurand anomaly along an extensive elongate region, to a high spatial accuracy.

SUMMARY OF THE INVENTION

In accordance with a first aspect of the invention there is provided an apparatus for locating a measurand anomaly along an optical waveguide comprising:
  an optical waveguide;
  a light source configured to transmit light along the waveguide;

a plurality of sensors provided along the waveguide, each sensor being configured to reflect a portion of light propagating along the waveguide at a respective sensor wavelength corresponding to a measurand, wherein the plurality of sensors is configured into one or more sets according to their sensor wavelengths, each set comprising a plurality of sensors with respective sensor wavelengths, the sensors are configured such that the sensor wavelength for each sensor in a respective set is approximately equal when the measurand experienced by each of the sensors in that set is equal;

a detector configured to monitor the light reflected by the sensors; and a control system configured to cause the following steps to be performed:

(i) transmitting light along the optical waveguide using the light source;

(ii) monitoring the light reflected by the sensors so as to obtain a measured spectrum representing a measurand experienced by each of the sensors;

(iii) detecting an anomalous signal in the measured spectrum, the anomalous signal having a characteristic wavelength and originating from an anomalous sensor of the plurality of sensors, the anomalous sensor experiencing the measurand anomaly; and (iv) locating at least the set comprising the anomalous sensor.

Unlike WDM systems, there is no requirement for each of the sensors to reflect light at a different sensor wavelength when the measurand is the same at each of the sensors. This means the apparatus is not limited by the number of sensors that can be provided along a waveguide. Furthermore, unlike TDM systems, the anomalous signal is detected in the measured spectrum (obtained using the aggregate response from each of the sensors) rather than by resolving and analysing the light reflected from each sensor individually. This means that each sensor does not need to be separated by a minimum distance along the waveguide. Advantageously still, by using sensors that are distributed along an optical waveguide instead of salt-filled conductors, the apparatus can be made light-weight and flexible. This is particularly desirable in the aerospace industry where there is a drive to reduce the weight of the aeroplane so as to improve its fuel efficiency.

Typically a plurality of said sets is provided. The sensors of each set are typically spatially grouped together along the optical waveguide. Furthermore each set may comprise at least five sensors. The provision of one or more sets of sensors allows for different sections of the waveguide to be spatially separated for independent analysis. For example, different requirements may need to be met to detect an anomalous signal from an anomalous sensor in each set. It is hence possible for a particular measurand value to be treated as anomalous if it is obtained from a sensor of one set, but to be treated as "normal" if obtained from a sensor of another set. Each set may therefore be configured to detect a measurand anomaly at different respective values for that measurand.

In some scenarios it may be sufficient to simply determine which set comprises the anomalous sensor in order to approximate the location of the measurand anomaly. If only one set is provided, the set containing the anomalous sensor may be identified as soon as an anomalous signal is detected. If a plurality of sets is provided, the set comprising the anomalous sensor may be detected by a process of analysing the measured spectrum. Pre-stored information regarding the layout of the sets may then be used to approximate the location of the measurand anomaly. If a more precise location is required, step (iv) may comprise locating the anomalous sensor by transmitting a pulse of light at the characteristic wavelength of the anomalous signal and monitoring the time of flight for the reflected signal. An anomalous signal may hence be detected in a measured spectrum, and a pulse of light transmitted at a characteristic wavelength for the anomalous signal. Detecting the anomalous signal includes a process of identifying the characteristic wavelength. The light which is transmitted by the light source at step (i), and/or at step (iv) (where appropriate), may be narrowband (having a bandwidth below 0.1 nm), or monochromatic (having a bandwidth between 0.01 to 0.1 pm). Preferably the light source comprises a laser, wherein the linewidth of the light emitted is preferably below 75 GHz, more preferably below 50 MHz. Typically only the sensor which is experiencing the measurand anomaly will reflect a portion of the light emitted at this characteristic wavelength. The time of flight for the reflected signal may hence be calculated to locate the anomalous sensor and hence the position of the measurand anomaly.

The anomalous signal is typically a separate peak which becomes visible in the measured spectrum only when a measurand anomaly occurs. The anomalous signal typically exhibits a Gaussian or similar profile (such as a sinc profile) corresponding to the reflection from an anomalous sensor of the plurality of sensors. The characteristic wavelength occurs within a wavelength range occupied by the anomalous signal and may correspond to the peak wavelength or an approximation thereof.

Preferably the sensor wavelength for each sensor in a respective set is equal when the measurand experienced by each of the sensors in that set is equal, however minor deviations between the sensor wavelengths may often occur as a result of the manufacturing process. The word "substantially" may be therefore by interpreted as including sensor wavelengths within a wavelength range of 0.1 nm. The sensor wavelength may correspond to a particular wavelength for which the reflectivity of the sensor is highest. The sensor wavelength for a sensor typically varies with changes in the measurand value. An anomalous signal may then only occur when the measurand at one of the sensors in a set is significantly different from that of the remaining sensors in the set. Advantageously the position of only the anomalous sensor experiencing the measurand anomaly may hence be isolated and detected.

Typically, the sensors are configured such that at least a portion of the light reflected from the sensors of each set substantially overlaps in wavelength so as to form a set response for each set having an uninterrupted peak width in the measured spectrum, wherein the anomalous signal does not overlap a set response in wavelength. Minor changes in a measurand may typically be experienced between different sensors of a given set, these minor changes corresponding to variations in the local environment which are part of the normal operating conditions. It is desirable however that a measurand anomaly is only detected and located if the measurand is significantly higher or lower than it was during a previous measurement, or if it differs substantially from the measurands monitored by the remaining sensors of the set. By arranging the sensors of each set to form respective set responses, an anomalous signal may be identified using simple peak analysis in the measured spectrum.

Typically each sensor is configured such that its sensor wavelength is perturbed in response to a change in the measurand at the sensor. A variety of different sensors may be used however preferably the sensors comprise fibre Bragg gratings, in which case the sensor wavelength of each fibre Bragg grating is a Bragg wavelength. FBGs are desirable due to their operability at extreme temperatures, the relative ease with which they can be manufactured and because many FBGs may be provided along a single waveguide.

The light source is preferably configured to selectively emit narrowband light and to modulate the wavelength of said light. The wavelength of the light reflected from each sensor will typically be approximately equal to the wavelength of the light emitted by the light source. If a narrowband, or preferably monochromatic light source is used, the wavelength of the emitted light may be known and so there is no need to monitor the wavelength of the reflected light. A simple intensity detector may then conveniently be used with the wavelength information obtained from the light source to obtain the measured spectrum. Preferably still the light source is configured to emit pulsed light. This may be useful in step (iv) if a time of flight calculation is performed. Preferably still the light source may take the form of a laser which is selectively switchable between a continuous wave mode and a pulsed mode. For example, the light source may comprise a laser operating in continuous wave mode and an optical modulator to act as a shutter to selectively transmit or block the light from the laser.

The apparatus may in principle be used to locate an anomalous measurement from different types of measurands depending on the application. Typically however the measurand is temperature. For example, the apparatus may be configured to locate a hot-spot along the waveguide. Alternatively, the measurand may be stress or strain, including any other quantity that could be converted into a strain at the sensor (for example pressure, force and stress). This may desirable, for example, where the waveguide is arranged along a structural beam of a bridge or tunnel, or wherein the waveguide is arranged to monitor earth movements in and around pipelines foundations, dams or other structures.

Further aspects of the invention will now be discussed. These aspects share similar advantages as discussed in connection with the first aspect. The features discussed in connection with any one of the aspects are also combinable with the remaining aspects.

In accordance with a second aspect of the invention there is provided a method for locating a measurand anomaly along an optical waveguide comprising the following steps:

(i) transmitting light along an optical waveguide, wherein a plurality of sensors is provided along the waveguide, each sensor being configured to reflect a portion of the light propagating along the waveguide at a respective sensor wavelength corresponding to a measurand, wherein the plurality of sensors is configured into one or more sets according to their sensor wavelengths, each set comprising a plurality of sensors with respective sensor wavelengths, the sensors are configured such that the sensor wavelength for each sensor in a respective set is substantially equal when the measurand experienced by each of the sensors in that set is equal;

(ii) monitoring the light reflected by the sensors to obtain a measured spectrum representing the measurand experienced by each of the sensors;

(iii) detecting an anomalous signal in the measured spectrum, the anomalous signal having a characteristic wavelength and originating from an anomalous sensor of the plurality of sensors, the anomalous sensor experiencing the measurand anomaly; and (iv) locating at least the set comprising the anomalous sensor.

Step (iii) may comprise detecting the anomalous signal using a spectral analysis technique. Preferably the spectral analysis technique of step (iii) comprises comparing the measured spectrum with a target spectrum so as to detect an anomalous signal in the measured spectrum corresponding to a difference between the measured spectrum and a target spectrum. The target spectrum may correspond to an earlier measured spectrum obtained, for example, during a calibration process.

Alternatively, step (iii) may be performed without reference to a target spectrum, for example by detecting a discernible peak of a certain width in the measured spectrum, said peak corresponding to the anomalous signal, and/or by detecting a reflected signal within the measured spectrum occurring within a certain wavelength range. More generally, the spectral analysis technique may comprise analysing the shape of the measured spectrum without reference to a predetermined threshold of either the optical signal intensity or the measurand value. This may include the identification of peaks. The spectral analysis technique may comprise evaluating an excursion parameter representing a difference between the measured spectrum and an expected spectrum and then comparing the excursion parameter with a threshold. Such an excursion parameter may be based upon the identification of new peaks or the movement of an average or central position of the peaks for example.

Furthermore the spectral analysis technique may further comprise monitoring for changes in the measured spectra obtained at different times. Thus a time series of spectra may be measured and analysed to detect developing anomalies.

As discussed above in connection with the first aspect, step (iv) preferably comprises locating the anomalous sensor by transmitting a pulse of light at the characteristic wavelength of the anomalous signal and monitoring the time of flight for the reflected signal.

In another approach step (iii) may comprise determining whether the anomalous signal corresponds to a measurand within a predetermined measurand range and proceeding to step (iv) only if the measurand is within the predetermined measurand range. The predetermined measurand range typically corresponds to predetermined values for a measurand that are outside a normal operating range. The predetermined measurand range may hence include all values for a measurand above and/or below a predetermined measurand value, and so may be a semi-infinite range. Alternatively the predetermined measurand range may be finite. For example, step (iii) may comprise determining whether the anomalous signal occurs within a predetermined wavelength range (for example above or below a wavelength threshold) and proceeding to step (iv) only if the anomalous signal occurs within said predetermined wavelength range. Optionally, step (iii) may comprise determining whether the intensity of the anomalous signal exceeds a threshold intensity and proceeding to step (iv) only if the anomalous signal exceeds the threshold intensity. This may help to ensure the anomalous signal detected is not the result of noise. Taking account of the noise in the data is beneficial with each of the anomaly detection techniques discussed.

When the method includes step (iv) it is beneficial to operate the light source in the form of a laser in a continuous wave mode so as to obtain the measured spectrum and also operate the same laser in a pulsed mode for locating the anomalous sensor. This also is a key enabler for applications in which repeated spectral measurements and anomaly locating are needed in which was the method advantageously further comprises repeatedly switching rapidly back and forth between a scanning mode to obtain the measured spectrum and a locating mode to locate the anomalous sensor.

Preferably, step (i) comprises transmitting light across a wavelength range containing each of the sensor wavelengths. This may be achieved either using broadband light or narrowband light (provided the wavelength of the narrowband light is adjusted so as to cover the spectral range encompassing each of the sensor wavelengths). For example, step (i) may comprise transmitting narrowband light in a sequence at each of the sensor wavelengths. This sequence may comprise a series of pulses at different wavelengths. Alternatively, the wavelength of the narrowband light may be adjusted in a continuous manner across a range of wavelengths including each of the sensor wavelengths.

Preferably, step (iv) comprises transmitting a pulse of narrowband light at the characteristic wavelength. A reflected pulse may then be received from the anomalous sensor only.

In accordance with a third aspect of the invention there is provided a computer system configured to perform the method of the second aspect.

In accordance with a fourth aspect of the invention there is provided a sensor system comprising a target apparatus and an apparatus according to the first aspect, wherein the waveguide is arranged to monitor a measurand at different positions along the target apparatus. For example, the target apparatus may be a conduit configured to convey a fluid. A variety of different conduits could in principle be used, including pipelines. Typically the waveguide is configured to locate a leak of said fluid from the conduit, said leak corresponding to the measurand anomaly. For example, the conduit may be configured to carry a fluid (such as a liquid or gas) at a temperature substantially different from the ambient temperature of the waveguide and/or the temperature of the local environment. In a particularly advantageous arrangement, the conduit is a bleed air duct of an aeroplane. Alternatively the target apparatus may be an electrical apparatus, such as an electrical cable. In this case the waveguide may be configured to locate a measurand anomaly in the form of a hot-spot at a position along the electrical apparatus. This hot-spot may be the result of insulation breakdown in a cable or another type of failure.

BRIEF DESCRIPTION OF THE DRAWINGS

Embodiments of apparatuses and a method according to the present invention are now described with reference to the accompanying drawings, in which.

DETAILED DESCRIPTION

Figure 1:
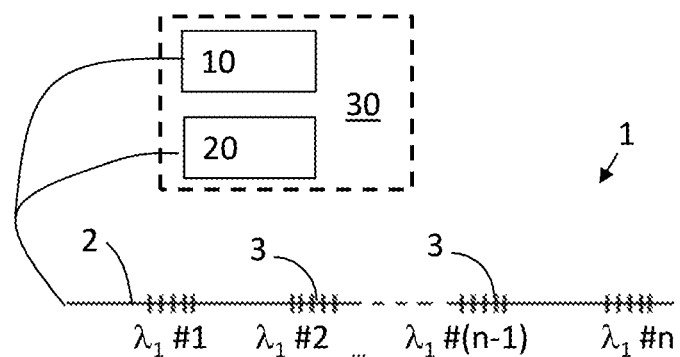
FIG. 1 is an apparatus according to a first embodiment of the invention.
Figure 2:
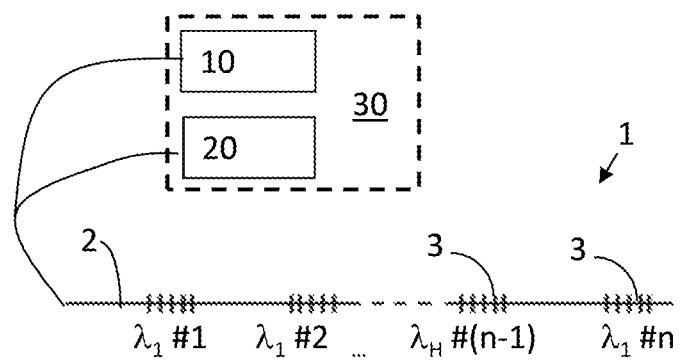
FIG. 2 is an apparatus according to a first embodiment illustrating a temperature anomaly.

FIGS. 1 and 2 illustrate an apparatus 1 in accordance with a first embodiment. The apparatus 1 comprises a light source 10 and a detector 20 which are housed within an interrogator 30. The interrogator 30 comprises a control system in the form of a computing system comprising memory (both volatile and non-volatile) and a processor. The interrogator 30 is configured to control the light source 10 and the detector 20 to perform a method which will later be discussed.

An optical waveguide 2 in the form of a fibre optic cable is provided. The waveguide 2 comprises a plurality of sensors 3 distributed along its length. The light source 10 comprises a tuneable laser which is optically connected to the waveguide 2 for emitting pulses of light into and along the waveguide 2. The light source 10 and the detector 20 are coupled to the same distal end of the waveguide 2 such that the detector 20 is configured to receive light reflected by the sensors 3.

In the first embodiment the detector 20 is configured to monitor the intensity of the reflected light, whilst the wavelength is input by the interrogator 30 at the wavelength which the light source 10 was tuned to for each respective emitted pulse. Alternatively, the wavelength may be monitored directly by the detector 20. Examples of suitable detectors therefore include spectrometers, interferometers and intensity detectors. Fast and sensitive detection is used as the sampling rate should be high enough to ensure that sufficient data points are sampled during the pulse. A flexible timing control for the light source 10 is used to modulate the wavelength (and potentially the pulse duration) between different emitted pulses and to coordinate the detection of returning pulses with the emission of transmitted pulses.

Tuneable lasers have a stable output and can be configured to selectively emit monochromatic pulsed light of a given wavelength and pulse duration through the optical waveguide 2, and further configured to modulate the wavelength of said emitted light such that different pulses can be emitted at different wavelengths. Examples of suitable lasers 10 include external cavity lasers, ring resonators, tuneable distributed Bragg reflector lasers and fibre lasers tuned with a Fabry-Perot cavity.

The light source 10 is configured to emit monochromatic light having a bandwidth of 0.04 pm. The light source 10 is provided with a shutter (or some other switch mechanism) which is used to control the duration of each emitted pulse. This shutter is typically a solid state device operating at 100 MHz to provide 10 ns pulses, equivalently of approximately 1 m in length. An example of a suitable shutter is a built-in SOA (Semiconductor Optical Amplifier). Alternatively an external modulator could be used, such as an EAM (Electro-Absorption Modulator), or an $LiNbO_3$ Mach-Zehnder modulator. The modulator may alternatively comprise an interferometric modulator, a mechanical shutter, an Electro-Optic Modulator, or an Acousto-Optic Modulator.

Each sensor 3 is configured to reflect a portion of light travelling along the waveguide 2 within a wavelength range for that sensor (for example between 0.2-1.0 nm), wherein peak reflections occur at a respective sensor wavelength according to a measurand experienced by the sensor 3. In the first embodiment, n sensors 3 are provided, each comprising a fibre Bragg grating (FBG) 3. An FBG comprises a grating which is written into the core of the waveguide 2 using spatially-varying patterns of intense UV laser light to create periodic modulations in the refractive index. These periodic modulations reflect light propagating along the waveguide 2 at a predetermined Bragg wavelength based on a given measurand. This Bragg wavelength may hence form the sensor wavelength earlier discussed. FBGs can be formed to have different Bragg wavelengths under similar environmental conditions by manufacturing the gratings to have different periodicity. In the first embodiment however each of the sensors 3 is manufactured to have gratings with the same periodicity. Under equal values of temperature and strain, each of the sensors 3 will therefore reflect light at the same sensor wavelength $\lambda_1$ (to within 0.1 nm, allowing for minor deviations resulting from the manufacturing process). Each sensor 3 has the same length (typically between 1 and 10 mm). Other types of sensors could also be used for which changes in a local measurand are transduced into changes in reflection. For example intensity-modulating sensors, interferometric sensors (such as Fabry-Perot cavities) or thin-film filters may be used.

As the light is incident on each sensor 3, a portion of any component with a wavelength that occurs within a wavelength band for that sensor is reflected. A means for suppressing reflections (not shown) may be further provided at the opposing end of the waveguide 2 from the light source 10 to prevent end reflections from propagating back down the waveguide 2 in the second direction 7 and subsequently being detected.

The apparatus 1 is configured to locate a measurand anomaly along the waveguide 2. In other words, the apparatus 1 may be used to at least approximate the position along the waveguide 2 from where a signal indicating an anomalous measurand originates. The particular measurand which is monitored will depend on the application. In the first embodiment the apparatus 1 is configured to monitor a temperature anomaly and so the sensors 3 are isolated from external strain such that the respective sensor wavelengths vary only with changes in temperature. This may be achieved by placing the waveguide 2 in a tube (not shown), so that it is free to move and is not pulled by axial movements or expansions of the tube.

The temperature anomaly is located by identifying the position of a sensor experiencing the measurand anomaly. FIG. 2 illustrates an apparatus 1 in which the temperature for each of the sensors 3, except the penultimate sensor 3, is within a normal operating range (for example 0-100° C.). The penultimate sensor 3 is outside of this range and so is experiencing a temperature anomaly in the form of a "hotspot". The sensor wavelength of the penultimate sensor 3 is therefore perturbed to $\lambda_H$ as a result of this anomaly (towards a longer wavelength), whereas the sensor wavelength for the remaining sensors is $\lambda_1$.

Figure 9:
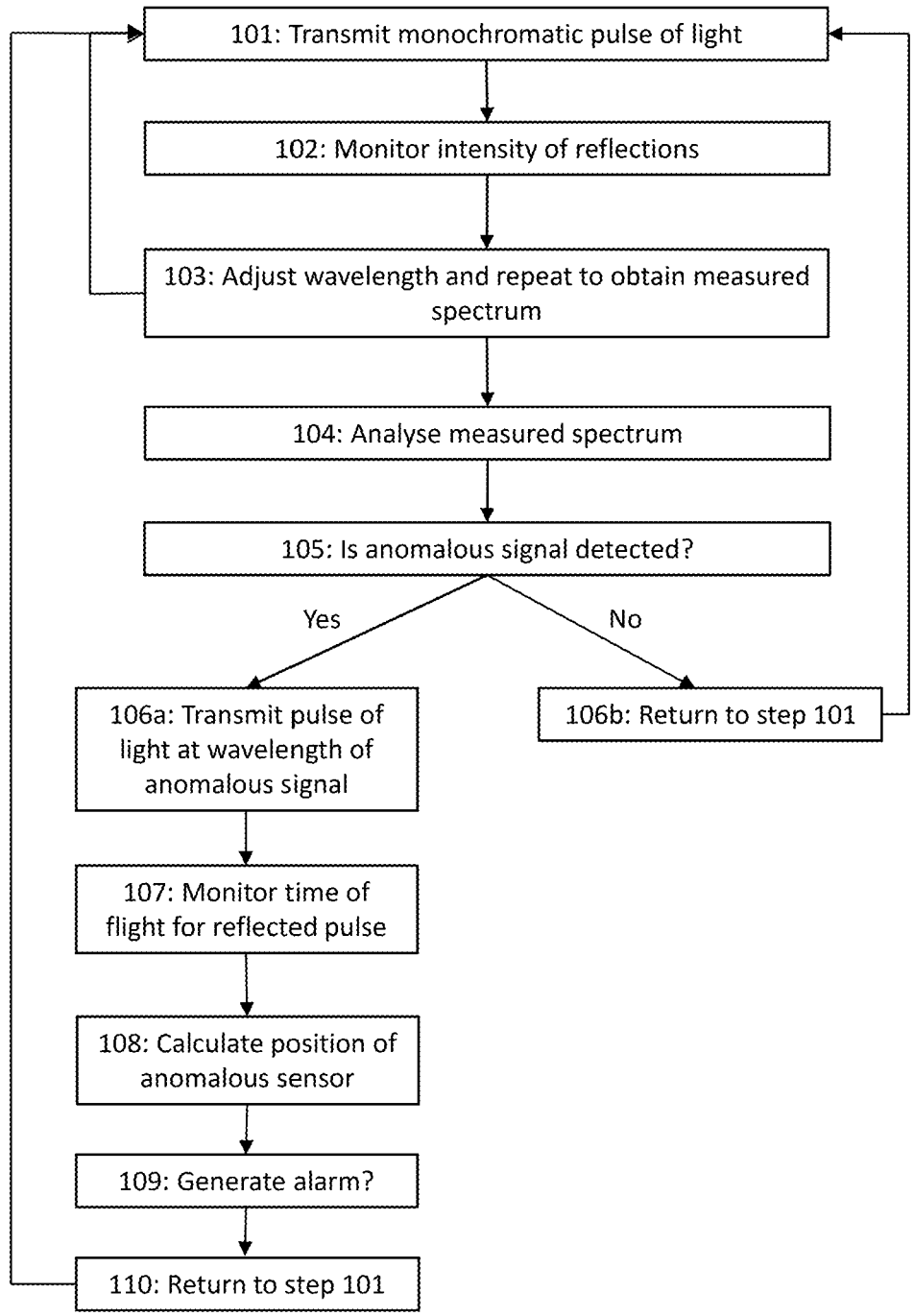
FIG. 9 is a flow chart illustrating a method for carrying out the invention using the apparatus of either the first or second embodiment.

An embodiment of a method for locating a measurand anomaly along an optical waveguide will now be discussed with reference to the flow diagram of FIG. 9 in combination with FIGS. 1 to 5.

The method begins at step 101 where the light source 10 is tuned to a first wavelength corresponding to the lowest sensor wavelength that is anticipated under a change in temperature at the sensors 3 over a predetermined range. Monochromatic light is then transmitted from the light source 10 along the waveguide 2. If the wavelength of the emitted light is within a respective wavelength range for a sensor 3, that sensor 3 will reflect a proportion of the emitted light back towards the interrogator 30. Maximum reflections (i.e. where the intensity of the reflected light is greatest) will occur when the wavelength of the emitted light is equal to the peak reflection wavelength of a sensor 3, referred to as the "sensor wavelength". In this embodiment the FWHM of each Bragg grating 3 is approximately 0.3 nm however more generally the FWHM may vary between 0.1 to 2 nm, depending on the size of the FBGs chosen. In some embodiments it may be desirable to use FBGs which reflect light at a FWHM between 0.1 to 0.2 nm. Minor perturbations of the Bragg wavelength that occur due to a change in measurand are detectable as a modulated peak frequency.

The intensity of any reflected light is monitored by the detector 20 at step 102. The wavelength for the reflected light is determined by the interrogator 30 from the wavelength which the light source 10 was tuned to prior to the reflected light being detected.

At step 103, with the shutter closed, the wavelength of the light produced by the light source 10 is increased, for example by 100 pm, and the shutter is then operated to transmit light along the waveguide 2 at a new wavelength. By using a light source with a bandwidth that is substantially less than the FWHM of the sensor 3, and by incrementing the wavelength of the emitted light in intervals that are substantially smaller than the FWHM (for example intervals ⅕ of the FWHM), enough samples are made of the reflection spectrum of each sensor 3 so that a good measure of the sensor wavelengths can be made. Steps 101 to 103 are repeated until the highest wavelength within the predetermined range is reached. Typically the sensor wavelength is perturbed by up to 1 nm per 100° C. change in temperature. A full working range for a sensor 3 is hence typically between 1 and 2 nm. The predetermined range is selected to correspond to this working range. The intensity of the light reflected at each of the wavelengths is aggregated to obtain a measured spectrum. Optionally a curve may be fitted to the measured spectrum.

Steps 101-103 could be performed using either pulsed or continuous emission of light, with the wavelength information obtained from the interrogator 30. Alternatively, a broadband light source could be used to emit continuous or pulsed light across the entire wavelength range, whilst the intensity and wavelength of the reflected light is monitored using a spectrometer.

Steps 101-103 may be completed in as little time as 1 millisecond. It is advantageous for these steps to be repeated several times to build an averaged measured spectrum having an improved signal to noise ratio than could be achieved using a single scan.

Figure 3:
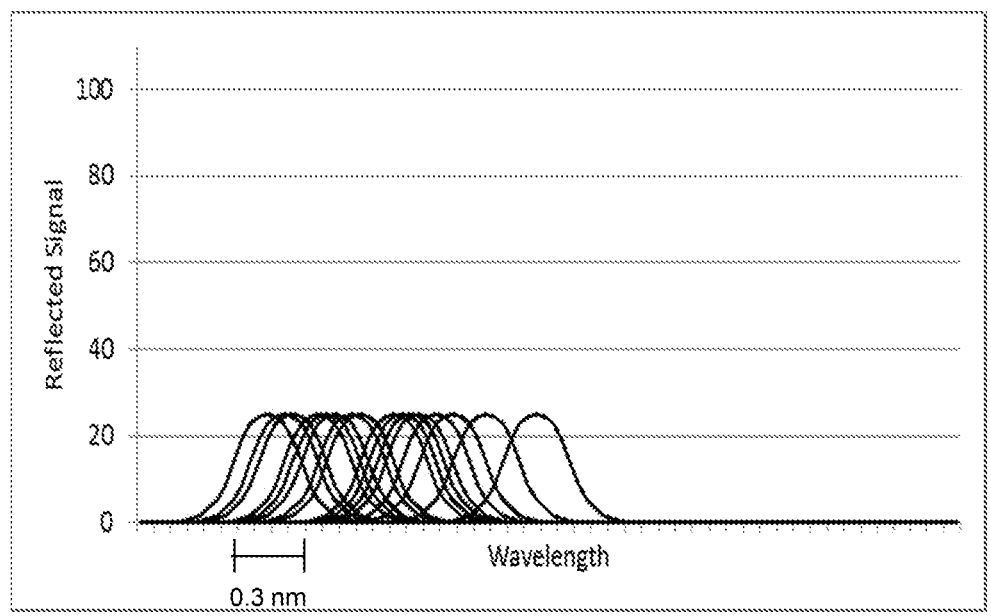
FIG. 3 is an example of the spectral response from sensors according to the first embodiment.
Figure 4:
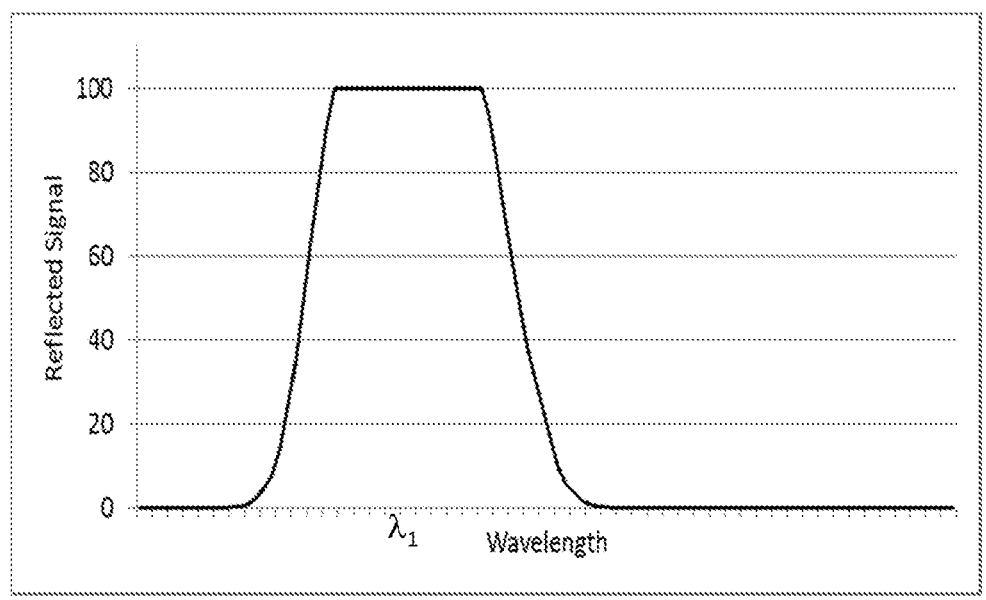
FIG. 4 is a first example of a measured spectrum obtained according to the first embodiment.

A first example of a spectrum comprising signals in the form of reflections from a plurality of sensors 3 is shown by FIG. 3. Each signal is overlapping in wavelength, as shown. Each of the sensors 3 is manufactured so as to have the same (or approximately the same) sensor wavelength under identical environmental conditions. In reality, changes in temperature or strain (for example), as well as minor manufacturing deviations, between the different sensors 3 will cause the sensor wavelengths to differ, as shown by FIG. 3. When aggregated however, the sensor wavelengths form a set response shown by FIG. 4 having an uninterrupted peak in the measured spectrum, centred at a wavelength of $\lambda_1$.

In FIG. 3 the intensity of the reflected pulse from each sensor 3 is approximately 25% of the saturation value of the detector 20. When these signals are aggregated into the measured spectrum of FIG. 4, the detector 20 saturates, giving the flat-topped response shown. It is not possible to determine the wavelength of any given sensor 3 within this broad reflection feature, although the range of maximum and minimum temperatures along the waveguide 2 can be estimated by looking at the low and high wavelength edges of the feature. In some embodiments the saturation point for the detector occurs at just above 100% of the output power for the light source, as this can allow for improved intensity measurements. Sensors 3 of any reflectivity may be used provided a clean signal is obtainable.

At step 104 the measured spectrum (shown by FIG. 4) is analysed. In the present embodiment the measured spectrum is compared to a target spectrum and any differences are identified by the interrogator 30. The target spectrum may be a spectral response stored in memory that the sensors 3 are expected to provide under "normal operating conditions" in which no measurand anomaly occurs. The target spectrum could correspond to an earlier measured spectrum, for example, for which no measurand anomaly occurred, and may be generated by a calibration process. For example, it may approximate to the spectrum shown in FIG. 4. The measured spectrum may then be subtracted from the target spectrum (resulting in a "difference spectrum") so as to identify the anomaly.

Alternatively, a method of peak analysis may be performed on the measured spectrum in which the set response is identified together with any other distinct peaks which do not overlap the set response. The set response itself may hence form the target spectrum with which the measured spectrum (which further includes any other peaks) is compared. In some cases the anomaly may therefore be identified by spectral analysis with no predetermined threshold of optical signal intensity or measurand value. In this approach an excursion parameter may be defined to represent the excursion of the anomaly outside the "normal range" of the measurand represented in the spectrum, with this excursion parameter then being compared with a threshold.

The spectral analysis, whether defining an excursion parameter or otherwise, could involve the detection of a separately-resolvable peak, such as by looking for a point of upward inflection on the downward-sloping part of the reflection spectrum. Hence, no prior knowledge of the value of the anomaly is needed and no comparison is made with any stored signal from an anomaly-free array. This is particularly advantageous in practice since it simplifies any initial or regular calibration requirements and tolerates any long term drift in the system data caused by changes in the physical system rather than the measurand itself.

A further approach, which may be used in combination with either of the above described techniques, is to identify the anomaly by looking for changes in the spectrum over time. This may be achieved by performing a scan of the relevant wavelengths as described (steps 101-103), comparing the spectral data obtained with that of a previous scan (such as by subtracting the previous scan data) and then looking for evolving features in the spectral data. Anomalies can be classified on the basis of the shape of the "difference spectrum" (resulting from the comparison), features in the difference spectrum exceeding a threshold value of intensity or wavelength or the rate of change of features in the difference spectrum as a function of the number of scans. The difference spectrum could be calculated from the running average of any number of previous spectra or an appropriate time-weighted average.

Figure 5:
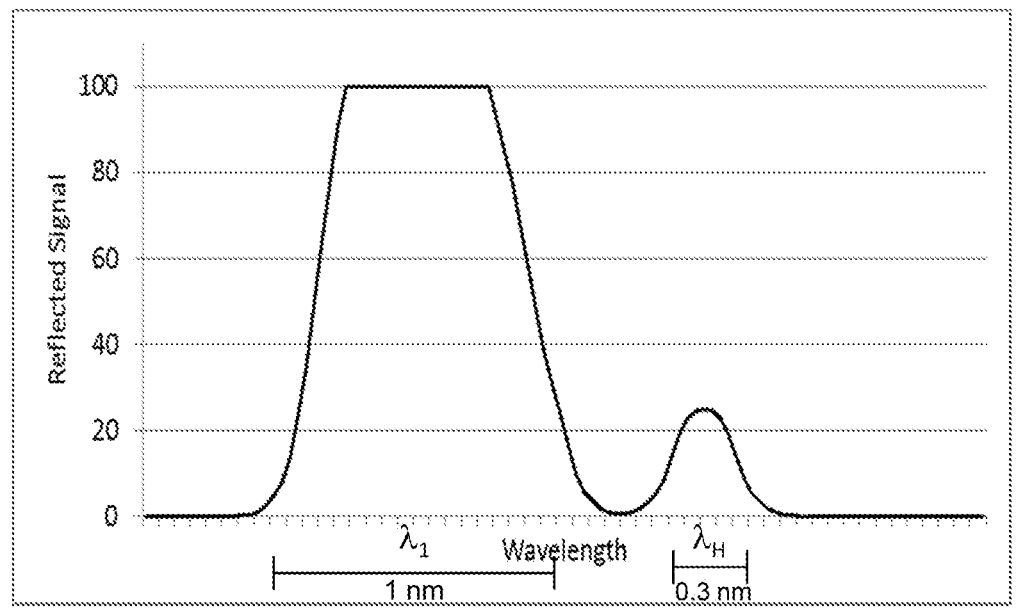
FIG. 5 is a second example of a measured spectrum obtained according to the first embodiment illustrating a temperature anomaly.

FIG. 5 provides an example of a measured spectrum exhibiting a peak having a characteristic wavelength $\lambda_H$ which does not overlap a broader set response. In FIG. 5, the anomalous signal has a FWHM of 0.3 nm. The set response is exaggerated in the drawings, but produces a broader feature in the measured spectrum, extending over a greater wavelength range than the anomalous signal. In FIG. 5, the set response has a width of approximately 1 nm. The set response and the anomalous signal are separated by 0.5 nm, corresponding to a temperature difference of 50° C.

Any differences between the target and measured spectra are then investigated using any of the techniques described above. At step 105, if the intensity of a resultant signal corresponding to the difference between the target and measured spectra exceeds an intensity threshold corresponding to "noise level" (for example 5% detector saturation), this signal is attributed to an anomalous signal originating from an anomalous sensor experiencing a measurand anomaly. In some embodiments anomalous signals are only identified for peaks within a predetermined wavelength range, for example above or below a wavelength threshold, the wavelength threshold corresponding to a minimum temperature deviation that a temperature anomaly must have. For example, a requirement may be set that temperature anomalies are only detected if the wavelength change is at least 0.4 nm; corresponding to a 40° C. temperature change relative to the set response or a pre-stored spectrum. In other cases the anomaly is identified based upon a deviation or change in the response, rather than relying upon the absolute magnitude of the wavelengths or intensities in question.

Alternatively, step 105 may be performed without reference to a target spectrum at all. For example, the anomalous signal could be detected by looking for a peak in the measured spectrum occurring at a predetermined wavelength or wavelength range that corresponds to a measurand anomaly (on the basis that a reflection will only occur at this wavelength if a measurand anomaly is present). Optionally the interrogator 30 may only detect signals having a threshold width and/or height in the measured spectrum. No comparison is needed, other than with stored values for threshold intensity, width of feature and potentially the maximum intensity of the feature.

Alternatively still, the interrogator 30 may be configured to detect a minimum in the measured spectrum (the minimum occurring between the set response and the anomalous signal) in order to detect the presence of the anomalous signal. Alternatively, an intensity threshold may be used to detect the presence of the anomalous signal. For example, rather than looking for a minimum and then a maximum, the interrogator 30 may look for a signal crossing a threshold intensity in a positive direction and then in a negative direction. The mid-point of those two crossings can then be calculated to determine the peak wavelength of the anomalous signal.

Regardless of the technique by which the anomaly is identified, the sensor wavelength of the anomalous sensor is then identified as the peak wavelength for the anomalous signal. The corresponding measurand value is calculated to an accuracy of ±5° C. (or less) and this data is subsequently stored in memory. Optionally the method then proceeds to step 106*a* only if the measurand value for the anomalous sensor exceeds a pre-determined measurand threshold. If no anomalous signal is detected, or the measurand value does not exceed the pre-determined measurand threshold, the method proceeds to step 106*b*, at which point it returns to step 101. Otherwise the method proceeds to step 106*a*. Suitable modifications of this approach may be made depending upon the technique chosen to identify the anomaly.

At step 106*a* the wavelength of the light produced by the light source 10 is then adjusted to a characteristic wavelength for the anomalous signal and a pulse of light is subsequently transmitted along the waveguide 2. In some instances it may not be possible to tune the wavelength of the light produced by the light source 10 exactly to the sensor wavelength, for example because the tuning occurs in discrete steps and the peak value falls between two tuning points. The characteristic wavelength may therefore be the wavelength, closest to the sensor wavelength of the anomalous sensor, which the light source 10 is able to transmit light at. Preferably the characteristic wavelength occurs within the FWHM of the anomalous signal in order for a reflected pulse to be returned with at least 50% of the maximum possible intensity. Outside this range the reflection would be weaker but may still be measurable.

It is of significant advantage in practice that the anomaly detection is performed by analysis of a spectrum acquired by a CW (continuous wave) laser capable of also operating in a pulsed mode. Such a laser provides advantages, when in CW mode, in terms of signal strength, duration and relaxation of requirements on detector speed. In such a case the anomaly location is performed by tuning the laser to the anomaly and switching the same laser to pulsed mode, where only timing considerations are important and measurement of the precise amplitude of the returned signal is not critical. Thus only a single light source is used, which can operate in CW mode (or indeed pulsed mode) for the spectral measurements and the same source is operated in pulsed mode for the location measurement. The use of these alternative modes allows optimisation for each function. Switching rapidly back and forth between a scanning mode and a locating mode (with any type of suitable laser) allows the evolution of any anomaly to be tracked and reduces the risk of the timing mode losing track of the anomaly in the wavelength domain. This switching can be repeated effectively indefinitely. The switching is preferably performed rapidly enough such that the anomaly does not move by more than a predetermined fraction of the peak with e.g., 0.5×(FBG FWHM) between scan/pulse cycles.

At step 107 the time of flight for the reflected pulse is monitored by the interrogator 30. The location of the anomalous sensor (from which the anomalous signal originates) is calculated at step 108 from the time of flight using $d=ct/2n$, where d is the distance from the interrogator 30, c is the speed of light in a vacuum, t is the time elapsed between when the pulse was emitted by the light source 10 and when the reflected pulse was detected by the detector 20 (i.e. the "time of flight"), and n is the effective refractive index of the waveguide 2. The distance calculated according to this equation is then compared to pre-stored data concerning the layout of the waveguide 2 so as to determine the location of the anomalous sensor and therefore also the location of the measurand anomaly. For example, if the waveguide 2 is installed in a vehicle, the calculated distance may correspond to a particular position in the vehicle where a measurand anomaly has been detected. Optionally, pre-stored information regarding the distribution of the sensors 3 may also be used to more accurately determine the location of the anomalous sensor. For example, the sensors 3 may be distributed regularly every 10 cm along the waveguide 2. If the distance calculated according to the above equation is 1028 cm, the interrogator 30 may determine that the closest sensor 3 to this calculated distance is at 1030 cm from the interrogator 30 and attribute the measurand anomaly to the position of that sensor 3. The value of the measurand of the anomalous sensor may also be calculated according to the characteristic wavelength.

The method then proceeds to step 109 where the interrogator 30 determines whether or not to trigger an alarm. For example, the measurand value may be compared to a threshold alarm value, which may be specific to that location along the waveguide 2. If the interrogator 30 determines that an alarm should be raised, an output signal is generated causing an alarm to be triggered on a user interface (not shown) that is electrically connected to the interrogator 30. The alarm informs the user of the location of the measurand anomaly and optionally the measurand value itself (e.g. the temperature of the hot-spot) so that the user can act accordingly. This data will be stored in the memory of the interrogator 30. Optionally, an output signal triggering an alarm may be generated immediately after the detection of an anomalous signal in step 106. Following step 109, the method proceeds to step 110 where it returns to step 101.

The interrogator 30 may be configured to determine the presence of a fault, for example resulting from a broken fibre or failed connector. This may be achieved by monitoring the measured spectrum, for example at step 104, to detect the presence of an elevated broadband back-reflection level, or a significant loss of reflected signal compared to an earlier stored spectrum. The earlier stored spectrum could be a recently obtained measured spectrum, for example from the preceding operational scan. Alternatively, rather than a stored spectrum, pre-stored information about expected reflection levels may be used to detect the fault. If a fault is detected, the light source 10 may be tuned to a wavelength outside of the sensor wavelengths and one or more pulses of light may be emitted. By calculating the time of flight of the reflected signal as before, the position of the fault can be identified. This position will be reported and stored in memory to later be fixed during maintenance.

Fast signal processing at the interrogator 30 enables the apparatus to report the results of scans and the status of the system at rates of 10 to 100 Hz.

Figure 6:
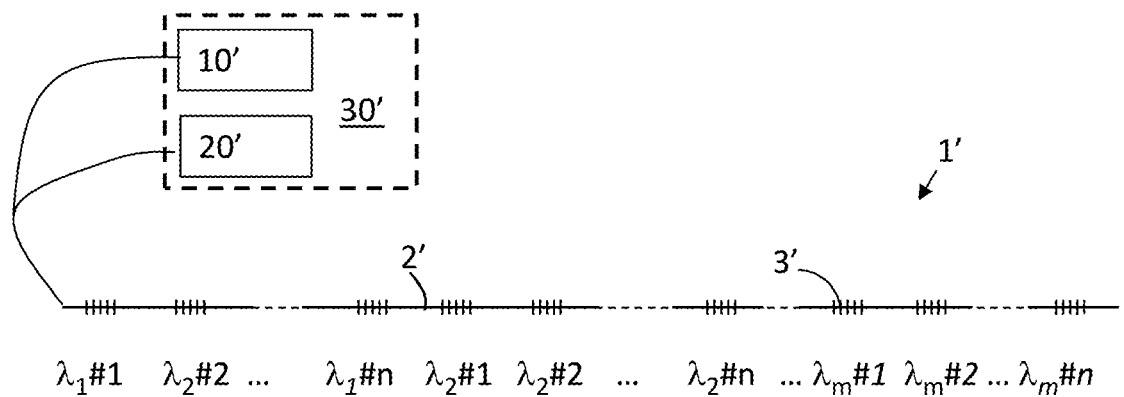
FIG. 6 is an apparatus according to a second embodiment of the invention.

A second embodiment of an apparatus 1' for locating a measurand is illustrated by FIG. 6. The apparatus 1' shares similar features as described in connection with FIGS. 1 and 2 wherein like reference numerals have been used to show corresponding features. The apparatus 1' forms part of a sensor system further comprising a conduit (not shown) configured to convey a fluid. The waveguide 2' is arranged to extend along the outside of the conduit (for example it may be connected to the outside of the conduit) such that the sensors 3' are arranged to detect the presence of a measurand anomaly along the conduit. This measurand anomaly may correspond to a fluid leak from the conduit.

The apparatus 1, 1' could be used in a variety of different applications, for example wherever there is a need to detect the presence of a leaking fluid from a conduit and this leaking fluid will be hotter or cooler than the ambient environment. For example, the conduit could be a pipeline carrying a hot liquid or gas. The apparatus may hence have particular applicability within the oil and gas industry, as well as the chemical process industry. Instead of a conduit, the waveguide may alternatively be arranged along a length of electrical cabling to locate hot-spots at a plurality of different positions along the cabling. In one example the waveguide is arranged to detect hot-spots caused by insulation breakdown inside high-voltage transformers. Other examples include the detection of hot-spots in tunnels, bridges, ships and pipelines. The apparatus 1, 1' may be conveniently retrofitted to a wide variety of existing installations, is light-weight and flexible, and so is simple to install.

In the second embodiment the conduit is a bleed air duct of an aeroplane. These carry hot air from an engine around the aeroplane and can be up to 50 m long. Should a leak occur along the conduit, a stream of hot air will be emitted, which may be as small as 25 mm wide. It is therefore desirable to provide a high density of sensors along a fibre which extends the entire length of the air bleed duct in order to ensure any leaks are detected. This is not achievable using conventional WDM/TDM methods as earlier discussed.

In the second embodiment shown by FIG. 6, the sensors 3' are FBGs as before and are separated at 25 mm intervals along the waveguide 2'. Each sensor 3' is isolated from external strain so as to respond only to temperature changes. Unlike the first embodiment, the sensors 3' of the second embodiment are arranged into a plurality of sets. The sensors of each set are manufactured identically so that the sensor wavelength for each sensor in a respective set is approximately equal when the temperature at each of the sensors in that set is equal. The sensor wavelengths of sensors in different sets differ substantially and are non-overlapping. There are m sets provided, each set comprising n sensors. The precise values of n and m will depend on the specifics of the application, such as the wavelength range of the light source, the temperature(s) for which an anomaly is detected, the FWHM of the sensor reflection spectra, and the number of measurements required. For example n may be at least 5, at least 10, at least 50, at least 100, at least 1000, at least 2000, and m may, for example, be any value between 2 to 10.

For a bleed air application, the normal operating temperature range may be −55 to 125° C. and the temperature which may be experienced during a measurand anomaly may be as high as 300° C. In practice, the alarm value may be 20° C. higher than the expected maximum operating temperature. The wavelength of a typical FBG shifts by 10 pm/° C., and so these temperature ranges can be translated into wavelength ranges of 1.8 nm during normal operation and up to another 1.75 nm during a measurand anomaly. Thus the maximum wavelength excursion is just over 3.5 nm. In addition to this, the FBG reflection spectrum occupies a finite spectral range of between 0.2 and 1.0 nm. Therefore, the respective sensor wavelengths for each set should be separated by at least 4.5 nm. In practice, manufacturing tolerances may mean that a preferred option is a 5 nm waveband, allowing eight such sets to be addressed by a light source having a 40 nm wavelength range. In this way, a given duct may be divided up into eight sets. All of the sensors from each set are spatially grouped together such that each set extends across a different region of the conduit. For example, only sensors from the first set may be provided along a region of the conduit which extends across a particular wing of the aeroplane. Typically the light source will transmit light across the wavelength range of 1528 to 1568 nm (corresponding to the "C band" referred to in the telecommunications industry) to address the sensors of these sets.

The apparatus 1' is operated according to the same method as earlier described with reference to the flow diagram of FIG. 9. Note that the wavelength of the emitted light is adjusted each time step 103 is reached so as to include the typical sensor wavelengths attributed to each set.

Figure 7:
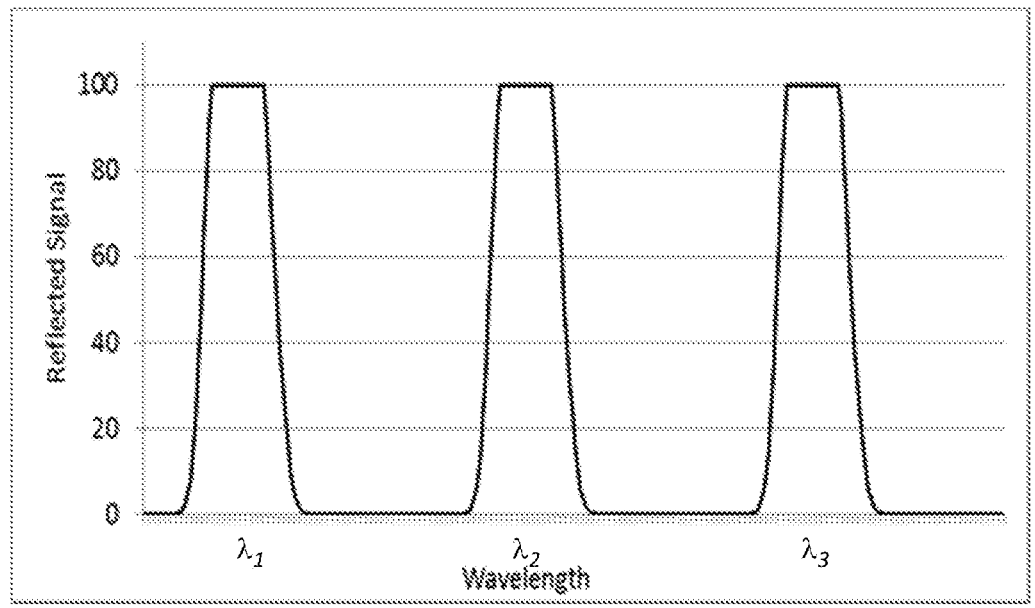
FIG. 7 is a first example of a measured spectrum obtained according to the second embodiment.

An example of a measured spectrum where no temperature anomaly has occurred is shown in FIG. 7. The light reflected from the sensors of each set substantially overlaps in wavelength to form a respective set response having an uninterrupted peak width in the measured spectrum, as before. The sensors 3' are configured such that the set response for sensors 3' in each set is non-overlapping. The set responses are each centred at a respective set wavelength ($\lambda_1$, $\lambda_2$ and $\lambda_3$) corresponding to an average sensor wavelength for that set (only the first three set responses are shown for clarity).

Figure 8:
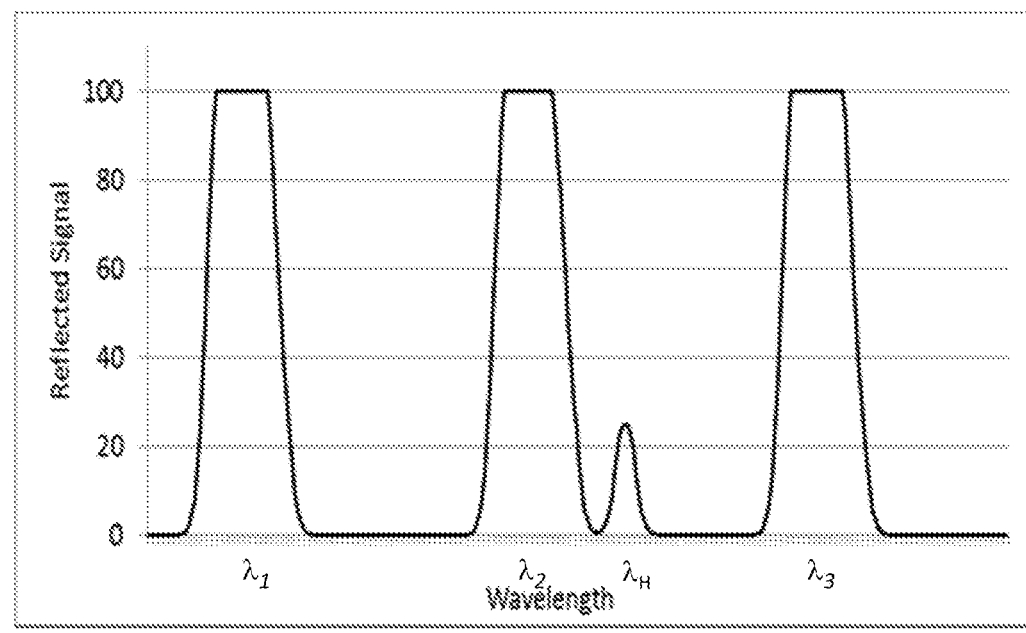
FIG. 8 is a second example of a measured spectrum obtained according to the second embodiment illustrating a temperature anomaly.

An example of a measured spectrum where a temperature anomaly has occurred is provided in FIG. 8. A peak centred at $\lambda_H$ which does not overlap any of the set responses is identifiable. It can be assumed that this signal originates from a sensor within the second set, because it is closest to the set response for the second set. Each set may be assigned its own intensity and wavelength thresholds for use in step 105 which is programmed into the firmware of the interrogator 30'. The thresholds may controllable using software on the interrogator 30'. In the present case, the peak centred at $\lambda_H$ exceeds the intensity threshold for the second set and so is identified as an anomalous signal. The anomalous signal corresponds to a reflected pulse originating from an anomalous sensor of the second set which is located proximal to a leak in the conduit and consequently experiencing a hot-spot. The location of the measurand anomaly may hence be approximated to somewhere within the portion of the waveguide comprising the sensors of the second set. Pre-stored information regarding the layout of the sets may then be used to relate this location to a portion of the conduit containing the leak. In some applications this may provide sufficient information for the method to proceed straight to step 109 where a decision is made regarding whether to raise an alarm. If a more precise location of the measurand anomaly is desirable, the location of the anomalous sensor may be found using steps 106a-108, as before.

Optionally, in response to generating an alarm, the apparatus 1' may output a signal that causes a mechanical operation to be performed so as to isolate the portion of the conduit containing the leak. For example, valves may be closed along the conduit at positions either side of the hot-spot (or the set containing the hot-spot) so as to isolate the fluid within that portion of the conduit. This will help to limit the amount of fluid which will leak from the conduit.

By arranging the sensors into sets according to their wavelength, a temperature anomaly may be detected if the temperature of a sensor in one section of the waveguide 2' (corresponding to a given set) coincides with a normal operating temperature in another section of the waveguide 2' (corresponding to a different set). This is possible because sensors of different sets will reflect light at different sensor wavelengths when experiencing the same temperature. For example, the apparatus 1' may be configured such that an alarm is only raised for a section of an air bleed duct that is normally cool, at less than 80° C., if a temperature anomaly at or above 120° C. is experienced. The same duct may have another section in which the normal operating temperature can be up to 125° C. Splitting the sensors into sets having different wavelength bands allows these two sections to be monitored using one waveguide 2'.

An aeroplane will typically have four bleed air ducts. In order to increase the likelihood of a leak being detected, and to provide a failsafe mechanism in case one of a failure of the apparatus, two waveguides will preferably be provided per duct, each comprising a plurality of sets of sensors as earlier described. These waveguides may be optically connected to a common interrogator or to different interrogators. Typically two interrogators would be used to protect against system failure. Each interrogator would run a complete set of sensors on all ducts for complete system redundancy.

It will be appreciated that the apparatus provided overcomes the deficiencies discussed with reference to the prior art. In particular, embodiments of the invention provide a light-weight, flexible apparatus which is easy to install and which is robust enough for applications such as an aeroplane. The apparatus may be repaired with relative ease, typically by replacing sections of the waveguide and requires few connectors. The sensors may be resilient enough to withstand exposures to extreme temperatures, for example a jet of air at 300° C. for up to 60 seconds. The sensors may also be immune to electromagnetic interference. Lastly, the apparatus can provide a higher density of measurements, as well as a greater overall number of measurements to be obtained along a given waveguide than is achievable for some prior art systems.

The invention claimed is:

1. An apparatus for locating a measurand anomaly along an optical waveguide comprising:
   an optical waveguide;
   a light source configured to transmit light along the waveguide, wherein the light source comprises a laser which is selectively switchable between a continuous wave mode and a pulsed mode;
   a plurality of sensors provided along the waveguide, each sensor being configured to reflect a portion of light propagating along the waveguide at a respective sensor wavelength corresponding to a measurand, wherein the plurality of sensors is configured into one or more sets according to their sensor wavelengths, each set comprising a plurality of sensors with respective sensor wavelengths, wherein the sensors are configured such that the sensor wavelength for each sensor in a respective set is equal to within a wavelength range of 0.1 nm when the measurand experienced by each of the sensors in that set is equal;
   a detector configured to monitor the light reflected by the sensors; and
   a control system configured to cause the following steps to be performed:
      (i) transmitting light along the optical waveguide using the light source by operating the laser in the continuous wave mode;
      (ii) monitoring the light reflected by the sensors so as to obtain a measured spectrum representing a measurand experienced by each of the sensors;
      (iii) detecting an anomalous signal in the measured spectrum using a spectral analysis technique, the anomalous signal having a characteristic wavelength and originating from an anomalous sensor of the plurality of sensors, the anomalous sensor experiencing the measurand anomaly, and wherein the spectral analysis technique comprises comparing the measured spectrum with a target spectrum so as to detect the anomalous signal in the measured spectrum corresponding to a difference between the measured spectrum and the target spectrum; and
      (iv) locating the anomalous sensor by operating the laser in the pulsed mode.

2. The apparatus according to claim 1, wherein step (iv) comprises locating the anomalous sensor by transmitting a pulse of light at the characteristic wavelength of the anomalous signal and monitoring the time of flight for the reflected signal.

3. The apparatus according to claim 1, wherein a plurality of sets are provided, wherein the sensors of each set are spatially grouped together along the waveguide.

4. The apparatus according to claim 1, wherein the sensors are configured such that at least a portion of the light reflected from the sensors of each set substantially overlaps in wavelength so as to form a set response for each set having an uninterrupted peak width in the measured spectrum, and wherein the anomalous signal does not overlap a set response in wavelength.

5. The apparatus according to claim 1, wherein each sensor is configured such that its sensor wavelength is perturbed in response to a change in the measurand at the sensor.

6. The apparatus according to claim 1, wherein the sensors comprise fiber Bragg gratings and wherein the sensor wavelength of each fiber Bragg grating is a Bragg wavelength.

7. The apparatus according to claim 1, wherein the measurand is temperature.

8. A method for locating a measurand anomaly along an optical waveguide comprising the following steps:
   (i) transmitting light along an optical waveguide by operating a laser in a continuous wave mode, wherein a plurality of sensors is provided along the waveguide, each sensor being configured to reflect a portion of the light propagating along the waveguide at a respective sensor wavelength corresponding to a measurand, wherein the plurality of sensors is configured into one or more sets according to their sensor wavelengths, each set comprising a plurality of sensors with respective sensor wavelengths, wherein the sensors are configured such that the sensor wavelength for each sensor in a respective set is equal to within a wavelength range of 0.1 nm when the measurand experienced by each of the sensors in that set is equal;
   (ii) monitoring the light reflected by the sensors to obtain a measured spectrum representing the measurand experienced by each of the sensors;
   (iii) detecting an anomalous signal in the measured spectrum using a spectral analysis technique, the anomalous signal having a characteristic wavelength and originating from an anomalous sensor of the plurality of sensors, the anomalous sensor experiencing the measurand anomaly, and wherein the spectral analysis technique comprises comparing the measured spectrum with a target spectrum so as to detect the anomalous signal in the measured spectrum corresponding to a difference between the measured spectrum and the target spectrum; and
   (iv) locating the anomalous sensor by operating the laser in a pulsed mode.

9. The method according to claim 8, wherein step (iv) comprises locating the anomalous sensor by transmitting a pulse of light at the characteristic wavelength of the anomalous signal and monitoring the time of flight for the reflected signal.

10. The method according to claim 8, wherein step (iii) comprises determining whether the anomalous signal corresponds to a measurand within a predetermined measurand range and proceeding to step (iv) only if the measurand is within the predetermined measurand range.

11. The method according to claim 8, wherein step (iii) comprises determining whether the anomalous signal occurs within a predetermined wavelength range and proceeding to step (iv) only if the anomalous signal occurs within said predetermined wavelength range.

12. The method according to claim 8, wherein step (iii) comprises determining whether the intensity of an anomalous signal exceeds an intensity threshold and proceeding to step (iv) only if the intensity exceeds the intensity threshold.

13. The method according to claim 8, wherein the spectral analysis technique comprises analysing the shape of the measured spectrum without reference to a predetermined threshold of either the optical signal intensity or the measurand value.

14. The method according to claim 8, wherein the spectral analysis technique further comprises evaluating an excursion parameter representing a difference between the measured spectrum and an expected spectrum and then comparing the excursion parameter with a threshold.

15. The method according to claim 8, wherein the spectral analysis technique further comprises monitoring for changes in the measured spectra obtained at different times.

16. A computer system configured to perform the method according to claim 8.

17. A sensor system comprising a target apparatus and an apparatus comprising;
   an optical waveguide;
   a light source configured to transmit light along the waveguide, wherein the light source comprises a laser which is selectively switchable between a continuous wave mode and a pulsed mode;
   a plurality of sensors provided along the waveguide, each sensor being configured to reflect a portion of light propagating along the waveguide at a respective sensor wavelength corresponding to a measurand, wherein the plurality of sensors is configured into one or more sets according to their sensor wavelengths, each set comprising a plurality of sensors with respective sensor wavelengths, wherein the sensors are configured such that the sensor wavelength for each sensor in a respective set is equal to within a wavelength range of 0.1 nm when the measurand experienced by each of the sensors in that set is equal;
   a detector configured to monitor the light reflected by the sensors; and
   a control system configured to cause the following steps to be performed:
   (i) transmitting light along the optical waveguide using the light source by operating the laser in the continuous wave mode;
   (ii) monitoring the light reflected by the sensors so as to obtain a measured spectrum representing a measurand experienced by each of the sensors;
   (iii) detecting an anomalous signal in the measured spectrum using a spectral analysis technique, the anomalous signal having a characteristic wavelength and originating from an anomalous sensor of the plurality of sensors, the anomalous sensor experiencing the measurand anomaly, and wherein the spectral analysis technique comprises comparing the measured spectrum with a target spectrum so as to detect the anomalous signal in the measured spectrum corresponding to a difference between the measured spectrum and the target spectrum; and
   (iv) locating the anomalous sensor by operating the laser in the pulsed mode;
   wherein the waveguide is arranged to monitor a measurand at different positions along the target apparatus.

18. The sensor system according to claim 17, wherein the target apparatus is a conduit configured to convey a fluid, wherein the waveguide is configured to locate a leak of said fluid from the conduit, said leak corresponding to the measurand anomaly.

19. The sensor system according to claim 18, wherein the conduit is a bleed air duct of an airplane.

20. The sensor system according to claim 17, wherein the target apparatus is an electrical apparatus.

* * * * *